(12) United States Patent
Engel et al.

(10) Patent No.: US 7,311,448 B2
(45) Date of Patent: Dec. 25, 2007

(54) BEARING ARRANGEMENT FOR A HARVESTING MACHINE

(75) Inventors: Manfred Engel, Grosssteinhausen (DE); Joseph A. Teijido, East Moline, IL (US); Claus-Josef Vogelgesang, Mandelbachtal (DE); Fritz K. Lauer, Krähenberg (DE); Wolfram Elsner, Fellbach (DE); Rainer Schäfer, Zweibrücken (DE); Joshua D. Bacon, Tulare, CA (US)

(73) Assignee: Deere & Company, Moline, IL (US)

( * ) Notice: Subject to any disclaimer, the term of this patent is extended or adjusted under 35 U.S.C. 154(b) by 190 days.

(21) Appl. No.: 11/253,345

(22) Filed: Oct. 19, 2005

(65) Prior Publication Data

US 2006/0185337 A1    Aug. 24, 2006

(30) Foreign Application Priority Data

Feb. 24, 2005    (DE) .................. 10 2005 008 448

(51) Int. Cl.
*F16C 33/76* (2006.01)
(52) U.S. Cl. .................. 384/484; 384/480; 384/481; 384/445
(58) Field of Classification Search ............... 384/445, 384/486, 480, 481, 484; 492/7, 47; 56/14.7
See application file for complete search history.

(56) References Cited

U.S. PATENT DOCUMENTS

| | | | | |
|---|---|---|---|---|
| 2,014,859 A | | 9/1935 | Mitchell, Jr. ............... 308/187 |
| 2,827,344 A | * | 3/1958 | Maag ........................ 384/484 |
| 3,894,323 A | * | 7/1975 | Hamlen ...................... 165/89 |
| 4,852,230 A | * | 8/1989 | Yu ........................... 29/898.07 |
| 5,347,801 A | | 9/1994 | McIlwain .................... 56/341 |
| 5,378,000 A | | 1/1995 | Orlowski .................... 277/25 |
| 5,603,206 A | | 2/1997 | Horchler, Jr. |
| 5,928,121 A | * | 7/1999 | Stotz et al. .................. 492/7 |
| 6,139,478 A | * | 10/2000 | Viaud et al. ................. 492/47 |

FOREIGN PATENT DOCUMENTS

| | | |
|---|---|---|
| BE | 1011973 A3 | 3/2000 |
| DE | 2 322 458 | 11/1974 |
| DE | 35 16 131 | 5/1985 |
| DE | 41 38 857 A1 | 7/1992 |
| DE | 195 48 636 | 12/1995 |
| DE | 101 15 331 | 3/2001 |
| EP | 0 920 799 | 11/1998 |
| WO | WO 03/025436 A1 | 3/2003 |

OTHER PUBLICATIONS

European Search Report dated Apr. 20, 2006.

* cited by examiner

*Primary Examiner*—Árpád Fábián Kovács

(57) ABSTRACT

A bearing arrangement for a harvesting machine, including a bearing configured to couple a rotatable shaft with a chassis of the harvesting machine, a first element coupled with the shaft so as to be rotatable therewith, and a second element coupled with the chassis of the harvesting machine. Additionally, at least a portion of the second element is substantially concentrically enclosed by the first element and the first and second elements cooperate to define a contactless seal configured to substantially prevent contamination of the bearing. The shaft is coupled with a product treating element, such as a crop feeding and/or processing element that is driven or idle rotating.

18 Claims, 5 Drawing Sheets

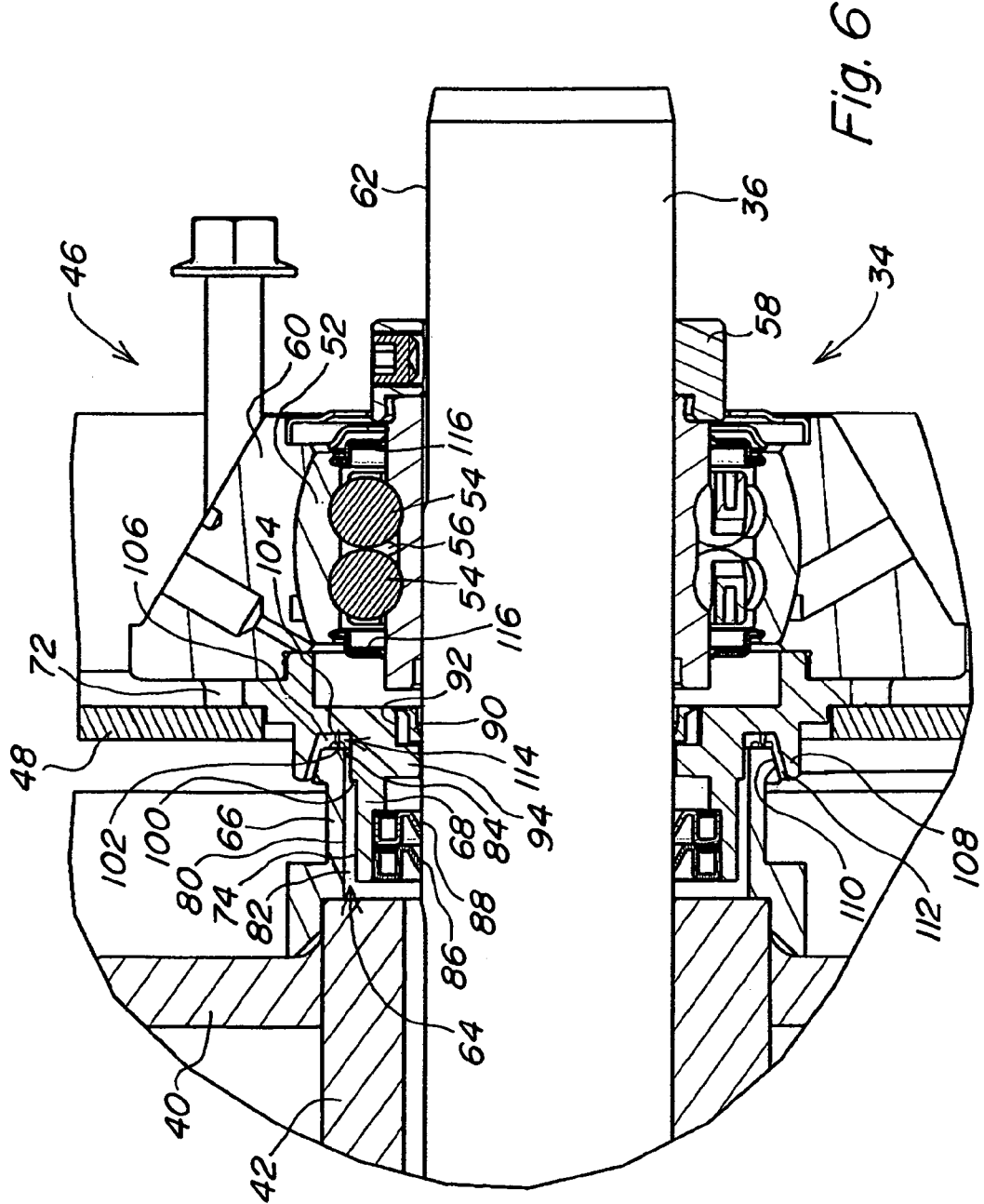

BEARING ARRANGEMENT FOR A HARVESTING MACHINE

BACKGROUND

1. Field of the Invention

The invention generally relates to a bearing arrangement for a product treating element for a harvesting machine. More specifically, the invention is for use with a machine having a driven or freely rotating shaft that is connected to a product conveying and/or product processing element.

2. Related Technology

DE 101 15 331, which is also published as U.S. Pat. No. 6,619,851, describes a bearing arrangement in which the rotating shaft of a harvested material processing device is supported by a rolling bearing on the frame of a harvesting machine. A first washer acting as a seal is joined stationary to the side wall of a feed channel of the harvesting machine and with the shaft encloses a relatively narrow gap. A second washer that also acts as a seal rotates with the shaft. The second washer is situated between the first washer and the rolling bearing arranged on the outside side of the side wall. The rolling bearing is to be protected from penetrating foreign material, in particular plant juices, by the washers and a seal with flexible lips that lie against a ball race of the rolling bearing, which ball race rotates with the shaft.

Another bearing arrangement is described in DE 195 48 636 A. The shaft has threads that in cooperation with stationary collectors are to discharge the plant juices to the outside and prevent damage to the rolling bearing.

DE 350 15 131 A describes another bearing arrangement with rolling bearings arranged on the outside of the side wall of a conveying channel, which rolling bearings are protected from penetrating plant juices by a labyrinth seal, whose part connected to the shaft is designed as a centrifugal washer.

Furthermore, U.S. Pat. No. 5,603,206 A suggests a bearing arrangement with a stationary axis that extends in the interior space of a rotating roller. A rolling bearing in the interior of the roller rotatably supports the roller on the axis. A sealing washer is connected to the roller and is in cooperation with a washer connected to the axis to seal the rolling bearing against the outside.

Finally, EP 0 920 799 A, which is also published as U.S. Pat. No. 6,139,478, suggests a bearing arrangement for a driven roller in which the rolling bearing is situated in an opening in the side wall of the compression chamber of a ball press and supports a shaft penetrating the opening. The rolling bearing is sealed by flexible sealing lips that rotate with the roller and that lie against a ring that extends axially and that is attached to the inside of the side wall.

SUMMARY

In one aspect of the present invention, a bearing arrangement is provided for use with a product treating element of a harvesting machine so that it is more difficult for plant juices to contaminate the components that rotatably connect a rotating shaft that is connected with the product treating element and a chassis of the harvesting machine. For example, in one aspect of the invention, the bearing arrangement includes a bearing configured to rotatably couple the shaft with the chassis, a first element that is coupled with the shaft, and a second element that is coupled with the chassis of the harvesting machine. Consequently, the outer first element rotates with the shaft, while the interior second element is stationary. At least a portion of the second element is substantially concentrically enclosed by the first element, and the first and second elements cooperate to define a contactless seal configured to substantially prevent contamination of the bearing.

In another aspect of the invention, the first and second elements cooperate to define a gap, at least a portion of which extends along a direction that is non-parallel to the shaft axis. More specifically, the portion of the gap extends along a direction that generally perpendicular to the shaft axis. Even more specifically, the gap preferably defines a generally conical shape that has a larger end facing the bearing. In this design, the rotating shaft and first element cause plant juices to be projected in the radial direction, away from the shaft and the bearing. The first element may also include a groove configured to channel the plant juices away from the shaft and to further prevent contamination of the bearing.

In addition, an assembly option for additional seals between the second element and the shaft is provided, in particular with flexible seal elements that are attached to the second element on the inside and that lie against the shaft with friction or smoothly.

The first and second elements generally define a labyrinth arrangement in one design. Furthermore, the bearing arrangement may also include a stepped surface having alternating flat surfaces and conical surfaces defining the labyrinth arrangement. Additionally, or alternatively, the labyrinth may be further defined by a second stepped surface. The second stepped surface may have a generally saw-toothed profile. Alternatively, the labyrinth is further defined by a generally smooth second surface.

In one preferred embodiment of the invention, the bearing is arranged on the outside of a wall in which an opening that is penetrated by the shaft is located, while the product conveying and/or product processing element is positioned on the inside of the wall.

In another preferred embodiment, a flange portion of the second element encloses at least a portion of the first element so that the first element and the second element cooperate to define a non-linear gap therebetween. For example, the non-linear gap may have a generally arc shape having a generally rounded or angled direction changes.

The invention is suitable for all product conveying and/or product processing elements of (self-propelled or mounted or towed) harvesting machines, even Erntevorsätzen. In particular, it can be used with forage harvesters that are frequently used to harvest plants from which juices flow that could damage bearings. The bearing can be used for draw-in rollers, chopping drums, rollers for re-comminution apparatus, or conveying apparatus (blowers).

Further objects, features and advantages of this invention will become readily apparent to persons skilled in the art after a review of the following description, with reference to the drawings and claims that are appended to and form a part of this specification.

BRIEF DESCRIPTION OF THE DRAWINGS

The drawings illustrate four exemplary embodiments that are explained in greater detail in the following:

FIG. 6 is a sectional view of a fourth embodiment of a bearing arrangement.

DETAILED DESCRIPTION

Figure 1:
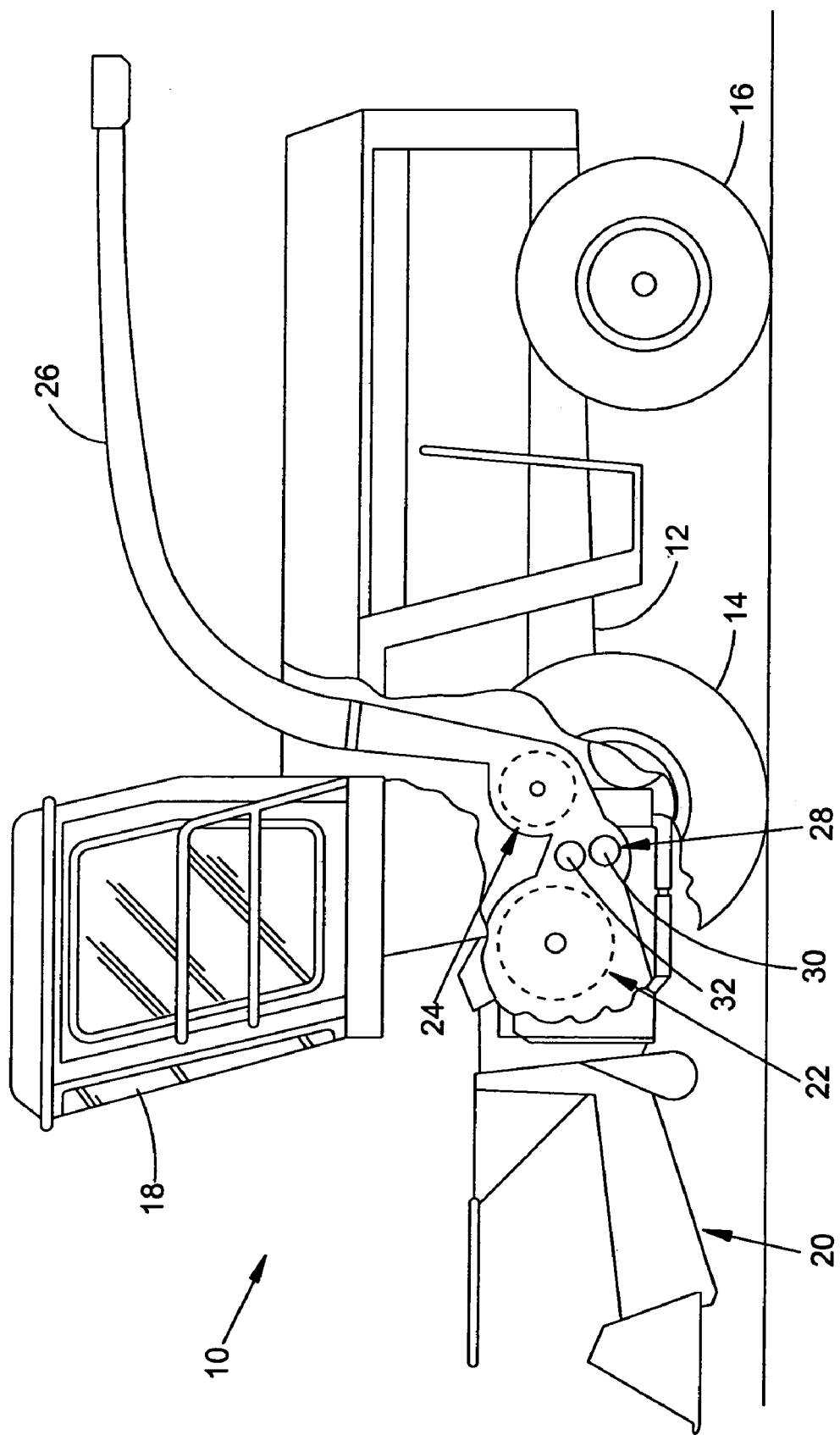
FIG. 1 is a side view schematic representation of a harvesting machine.

A harvesting machine 10 illustrated in FIG. 1 that is a self-propelled forage harvester is built on a chassis 12 that is borne by front and rear wheels 14 and 16. The harvesting machine 10 is operated from a driver's cab 18 from which a harvested material pick up apparatus 20 can be used in the form of a corn header. During operation of the harvesting machine 10, material such as corn, grass, or the like is picked up from the ground by the harvested material pickup apparatus 20 and is fed to a chopping drum 22 that chops the material into small pieces and feeds the chopped material to a conveying apparatus 24. The material travels from the harvesting machine 10 to a trailer driving alongside via a rotatable discharge shaft 26. Extending between the chopping drum 22 and the conveying apparatus 24 is a re-comminution apparatus 28 through which the material to be conveyed is fed tangentially to the conveying apparatus 24. The re-comminution apparatus 28 has two product treating elements, such as rollers 30, 32, that rotate opposite one another.

For the purpose of this application, the term "product treating element" encompasses any product conveying and/or product processing element. For example, if an element is configured to process the plant material by compressing or otherwise processing the material traveling therepast, then the element is a product treating element. As another example, if the element is configured to convey the material in a particular direction, or if it is configured to permit the material to be conveyed therepast, then the element is likewise a product treating element. The rollers 30, 32 shown in the figures are product treating elements because they are configured to convey and/or process plant materials migrating therepast.

During the conveying and/or processing of the harvested material, plant juices may be excreted from the material and may penetrate bearings of the product conveying and/or product processing element(s), potentially damaging or destroying the bearings. For example, the plant juices may cause or promote corrosion within the bearings. Additionally, or alternatively, the plant juices may be able to penetrate any other conveying and/or processing element(s) of the harvesting machine 10, such as the conveying device A and the draw-in rollers (not shown) That are upstream of the chopping drum 22.

Figure 2:
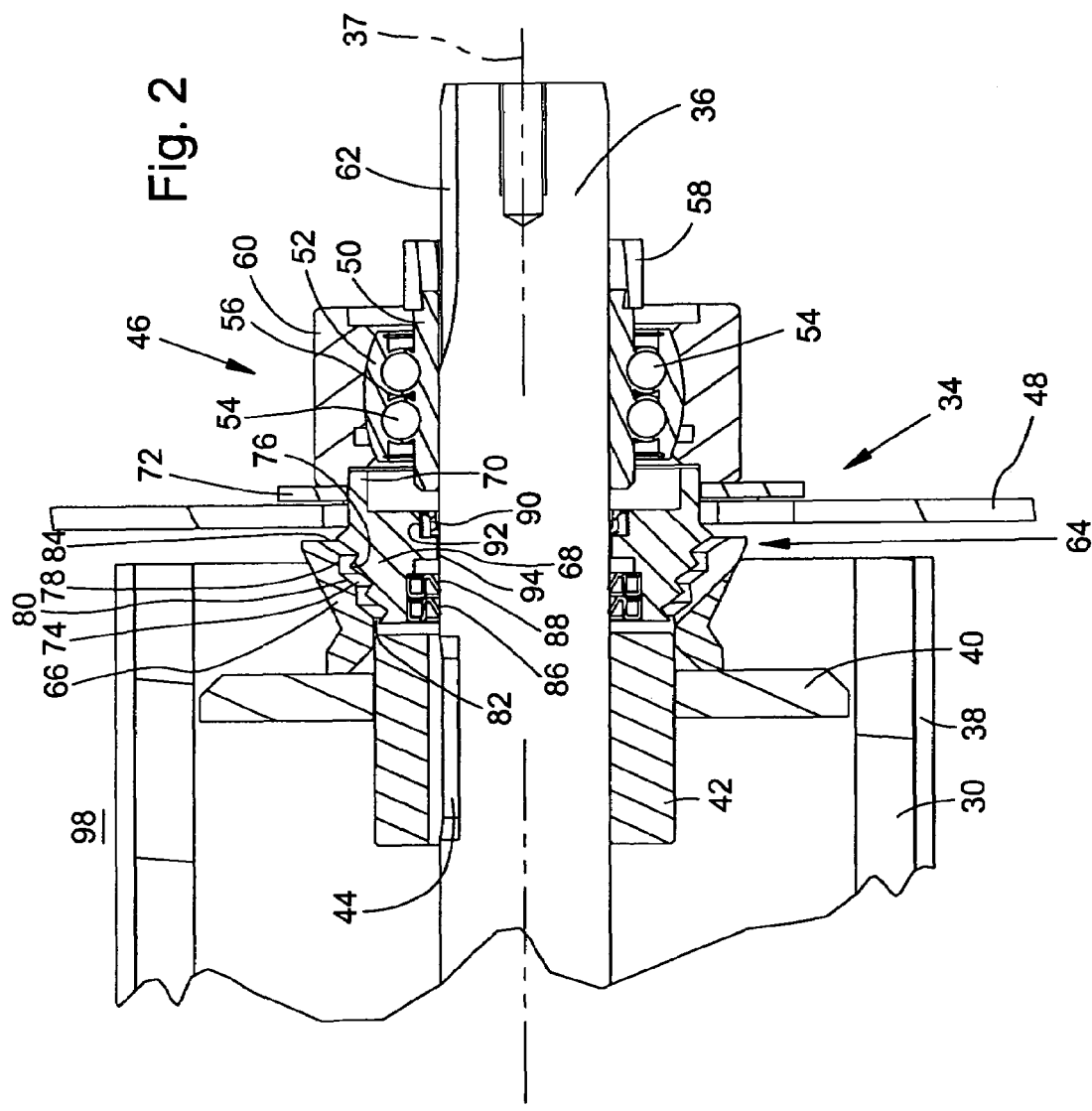
FIG. 2 is a sectional view of a first exemplary embodiment of an inventive bearing arrangement.

In order to prevent plant juices from penetrating into the rolling bearing, the lower roller 30 of the re-comminution apparatus 28 is equipped with a bearing arrangement 34 that is illustrated in detail in FIG. 2. Additionally, or alternatively, another end of the lower roller 30 is provided with such a bearing arrangement 34. As another additional or alternative configuration, the upper roller 32 is provided with such a bearing arrangement 34.

The roller 30 shown in the figures has a cover 38 which receives an end-side support disk 40 that is offset in the axial direction inward relative to the outer end of the cover 38. The support disk 40 is preferably connected to a shaft 36 via a ring 42 that extends substantially across the gap between the shaft and the roller 30 and that could also be designed as a shaft end and could terminate at the ring 42. The shaft 36 is connected to the ring 42 by a feather key connector 44 or is attached thereto in another desired manner.

The shaft 36 is connected by a bearing 46 as a roiling bearing to a side wail 48 that is supported directly or indirectly on the chassis 12. Therefore, the shaft 36 is rotatable about an axis 37 with respect to the chassis 12. The bearing 46 has an inner bail race 50 that is placed on the shaft 36 and an outer bail race 52 that encloses the inner bail race 50. Arranged between the inner ball race 50 and the outer bail race 52 as rolling bearings are two rows of balls 54 that are held by cages 56 and that roll in corresponding rounded tracks of the ball races 50, 52. The two rows of bails 54 are arranged one after the other in the axial direction. The inner ball race 50 s attached to the shaft 36 by a clamping disk 58. The outer ball race 52 is radially enclosed by a bearing house 60 that is attached to the wall 48 of the product conveying channel 98 of the harvesting machine 10.

In the embodiment shown in FIG. 2, the shaft 36 includes a channel for coupling a pulley or another drive means (not shown) to the shaft 36. Moe specifically, the channel 62 is formed in an end portion of the shaft 36 and is configured to receive a notch or another type of protrusion on the pulley so that the shaft 36 and pulley rotate in unison. In an alternative embodiment, the shaft 36 is not driven and the shaft 36 may not include a channel 62, In this embodiment, the roller 36 is able to rotate freely. More specifically, the roller 30 is preferably caused to rotate due to the moving harvested material.

In order to substantially seal the bearing 46 from the plant juices that may be present on the inside of the wall 48 in the product conveying channel 93 of the harvesting machine, thereby potentially improving the service life of the bearing 46, a contactless labyrinth-shaped seal 64 is provided on the inside of the wall 48. The seal 64 is constituted by a first element 66 ad a second element 68 that are both essentially rotationally symmetrical.

The first element 66 is coupled to an end portion of the ring 42. Preferably, the first element 66 encloses an outer surface of the end portion of the ring 42. Even more preferably, the first element 66 is secured to the ring 42 by a threaded engagement. Additionally, an end face of the first element 66 engages the support disk 40.

A body portion of the second element 68 is received within the interior space of the first element 66. Additionally, a flange portion 70 of the second element 68 extends through an opening in the wall 48 and into a complementary recess of the bearing housing 60, where it is secured to a mounting plate 72. The mounting plate 72, which is also secured to the wall 48, encircles the flange portion 70 and is preferably welded thereto. The opening in the wall 48 is penetrated by the flange portion 70 and is also penetrated by the shaft 36. The flange portion 70 and the opening in the wall 48 are preferably both concentric with the shaft 36. Furthermore, the second element 68 is preferably concentrically enclosed by the first element 68 such that both components 66, 68 are concentric with the shaft 36. The bearing housing 60 is also preferably secured to the flange portion 70 by appropriate means, such as a fastener. Other appropriate designs for affixing the second element 68 and the bearing housing 60 to the wall 48 may also be used with the present invention, such as soldered welded, adhesive, or screw-in joints.

The first element 66 and the second element 68 of the seal 64 cooperate to define a (labyrinth) gap 74 that has a zigzag shape. More specifically, the gap 74 is defined by the stepped outer surface of the second element 68 and the stepped inner surface of the first element 66. The outer surface of the second element 68 is generally defined by a saw-tooth shaped profile 76. Additionally, the inner surface of the first element 66 is generally defined by flat surfaces 78 and conical surfaces 80 that successively alternate with one another along the gap 74. The centers of the flat surfaces 78 are each situated opposite the tips of the profile 76 along a radial direction that is generally perpendicular to the shaft axis 37. The gap 74 generally defines a conical shape where the inboard end 82 (shown to the left in FIG. 2) is radially smaller than the outboard end 84 (shown to the right in FIG. 2).

Two additional seals 86, 88 are arranged axially one after the other between the second element 68 and the shaft 36 on the end of the second element 68 spaced-apart from the bearing 46. The additional seals 86, 88 are each attached to the second element 68 and have flexible lip-shaped sealing elements that lie against the shaft 36. A third seal 90 is attached to the shaft 36 and has a flexible sealing element that lies in a recess 92 of the second element 68, adjacent to the bearing 46. Between the additional seals 86, 88 and the third seal 90, the second element 68 has a projection 94 that is oriented inward radially and that with the shaft 36 includes a relatively small gap.

Figure 3:
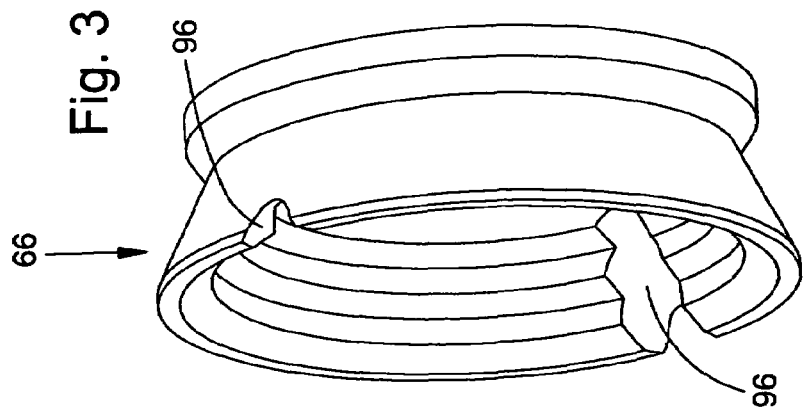
FIG. 3 is a perspective view of the first element of the labyrinth seal of the bearing arrangement in FIG. 2.

As shown in FIG. 3, the first element 66 includes a pair of inside grooves 96 that are generally offset by 180 degrees. As discussed in more detail below, the grooves are preferably able to channel plant juices away from the second element 68 and the shaft 36.

During operation, the seal 64 substantially prevents plant juices that are present or that become loose in the product conveying channel 98 from traveling to the inboard end 82 of the gap 74, which is shown on the left of FIG. 2. For example, the inboard end face of the first element 66 engages the support disk 40, thereby substantially plant juices from migrating therebetween. However, any plant juices that are able to travel to the inboard end 82 of the gap 74 preferably travel along the flat and conical surfaces 78, 80 of the first element 66 due to the centrifugal force of the rotating shaft 36 and/or surface adhesion to the respective surfaces 78 and 80. These plant juices are therefore preferably conducted in the outboard direction, from the inboard end 82 to the outboard end 84 of the gap, along the successively expanding inner diameter of the first element 66 along the surfaces 78 and 80. Due to the rotation of the shaft 36, the plant juices migrate into the grooves 96 and are channeled therealong towards the outboard end 84 of the gap, where the plant juices are propelled outwards in the radial direction, away from the seal 64.

However, plant juices could still appear at the end 82 of the gap 74, even if in small quantities. Since this end 82 is spaced relatively far from the bearing 46, the thus enabled installation of the additional seals 86, 88 and the third seal 90 substantially prevents these plant juices from penetrating to the bearing.

Figure 4:
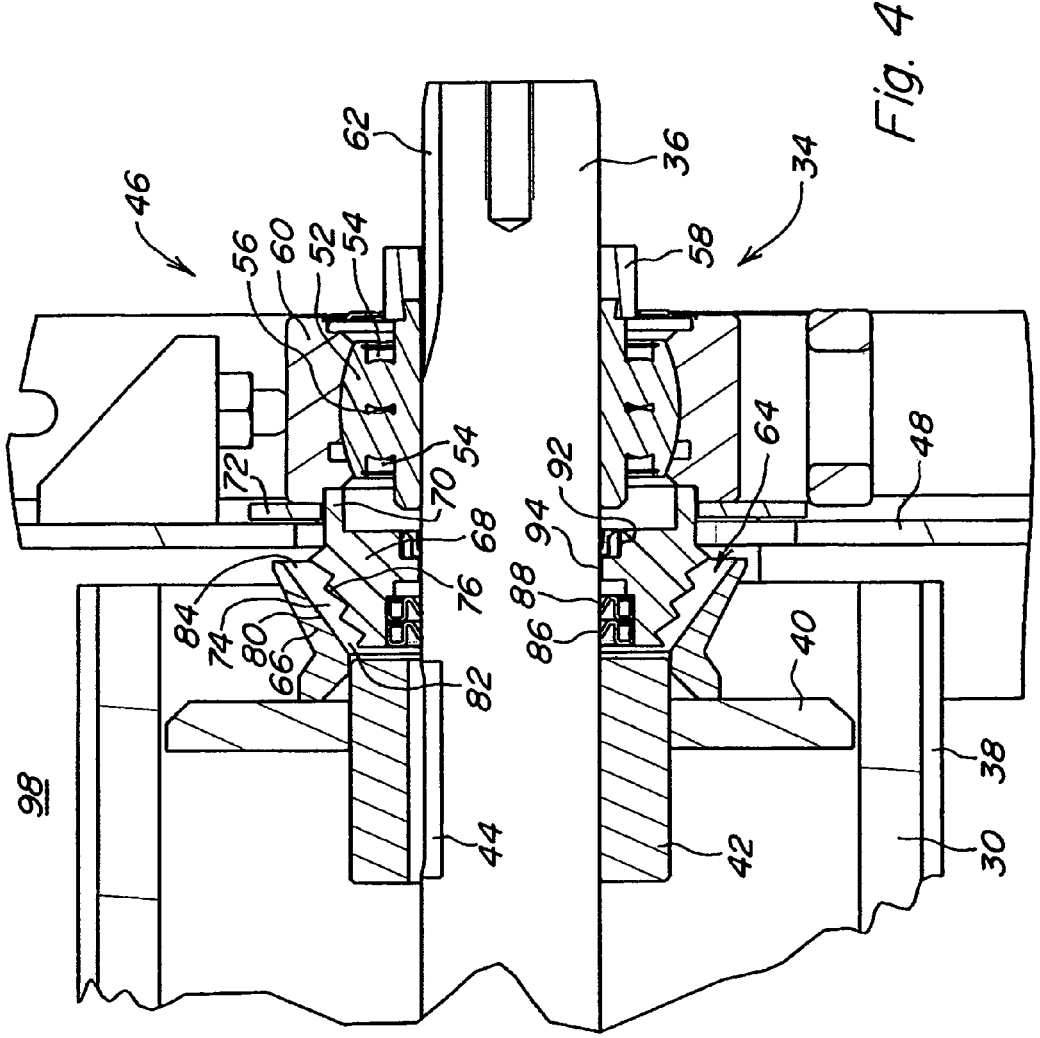
FIG. 4 is a sectional view of a second embodiment of a bearing arrangement.

FIG. 4 is a sectional drawing through a second embodiment of a bearing arrangement 34. Elements that correspond with the analogous elements in the first embodiment have the same reference numbers in the second embodiment. The first element 66 in the embodiment shown in FIG. 4 has a smooth inner surface, thereby allowing the plant juices to flow easily to the outside in the radial direction. In the second embodiment, the first element 66 can also be provided with two grooves that are offset by 180° (similarly to the grooves 96 shown in FIG. 3). As an additional or an alternative design, the second element may have a smooth outer surface.

Figure 5:
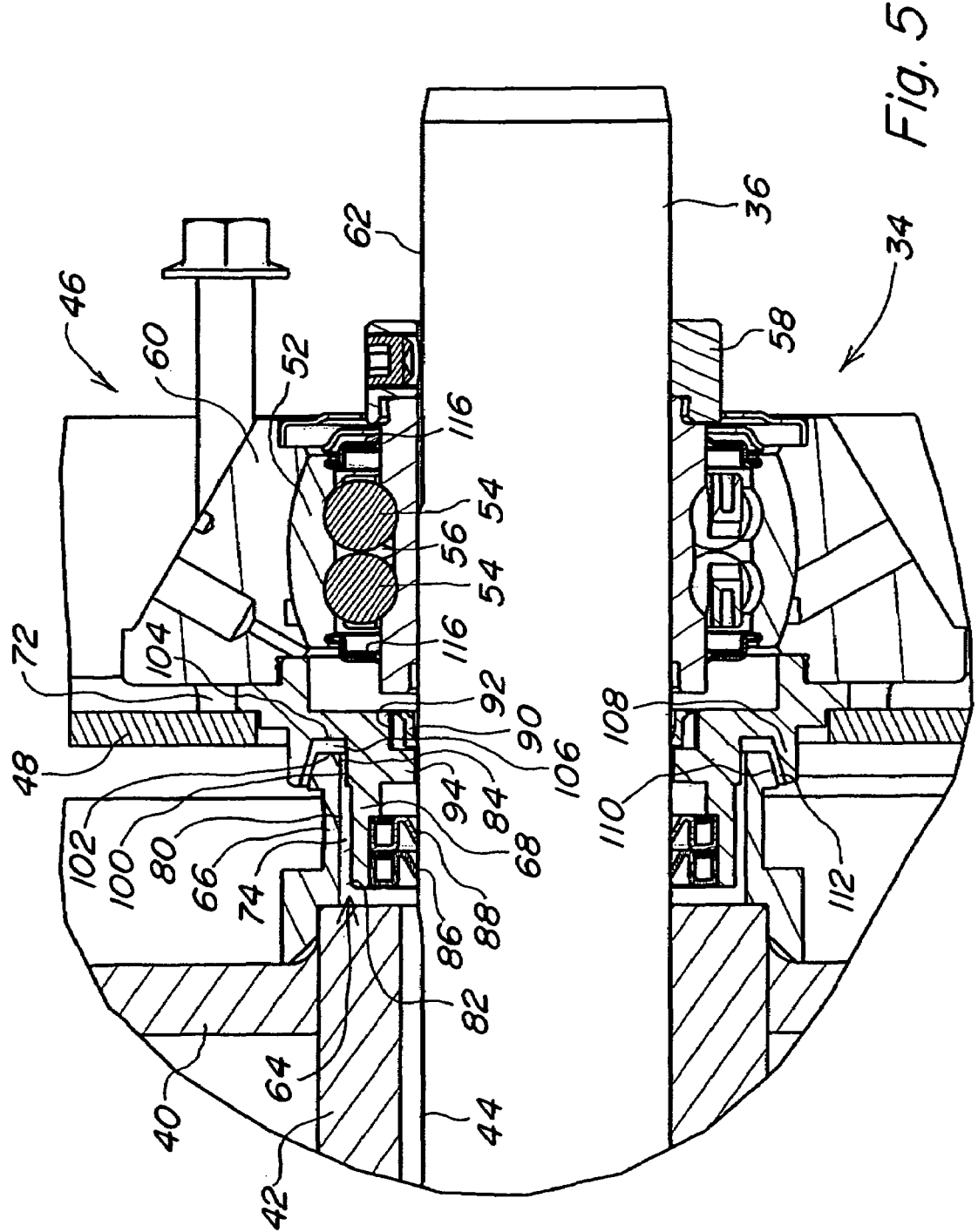
FIG. 5 is a sectional view of a third embodiment of a bearing arrangement.

FIG. 5 illustrates a third embodiment of an inventive bearing arrangement 34. Elements that correspond with the analogous elements in the first and second embodiments have the same reference numbers in the third embodiment.

The embodiment shown in FIG. 5 includes a gap 74 extending generally linearly in the axial direction. The inside of the first element 66 and the outside of the second element 68 are generally smooth, with the second element 68 defining a small radial step 100 in the vicinity of the end 84 of the seal 64 shown on the right, i.e., on the inlet side. The first element 66 includes at its end face 102 (shown on the right) cooperating with a surface 104 of the second element 68 to define a radially running sealing gap 106 that joins the inlet-side end 84 of the gap 74.

The second element 68 also includes a flange 108 that extends diagonally outward on the outside of the first element 66 in the axial direction. The flange 108 is spaced apart from the first element 66 to define another gap 112 that connects to the radially running sealing gap 106 and runs diagonally outward. Therefore, the flange 108 defines a generally arc-shaped path extending along the gap 74, then along the gap 106, and finally along the gap 112. At the inlet of the seal 64, impurities are therefore forced to follow a generally U-shaped path through the sealing gap 112, 106 and the contactless gap 74 in order to travel to the end 82 of the seal 64 and in front of the seal 86, which is relatively unlikely. One advantage of the third embodiment compared to the previously depicted embodiments is the greater axis proximity of the gap 74, which permits a smaller gap diameter in the seal 64 due to the smaller deformities that are to be expected during welding.

Furthermore, seals 116 are arranged on both sides of the spheres 54 in the third embodiment.

A fourth embodiment of an inventive bearing arrangement 34 is depicted in FIG. 6. Elements that correspond with the analogous elements in the first, second, and third embodiments have the same reference numbers in the fourth embodiment. The fourth embodiment includes a contactless labyrinth seal 114 within the radially running sealing gap 106. More specifically, the radially running sealing gap 106 is defined by first and second element 66, 68 walls that both respectively extend along a tortuous path to define the labyrinth seal 114. This design provides a more elaborate and tortuous path for the plant materials to travel, thereby further protecting the bearing from contamination. The labyrinth seal 114 could alternatively be arranged between the third element 108 and the surface 110 (or an additional labyrinth seal could be arranged there).

It is therefore intended that the foregoing detailed description be regarded as illustrative rather than limiting, and that it be understood that it is the following claims, including all equivalents, that are intended to define the spirit and scope of this invention.

What is claimed is:

1. A bearing arrangement for a harvesting machine, comprising:

said harvesting machine including a vertical wall joined to a chassis and including an opening;

a product treating element coupled to a shaft having an end region projecting through said opening in said vertical wall;

a bearing configured to couple said end region of said shaft with said wall, and hence to said chassis of the harvesting machine so that the shaft is rotatable about a shaft axis with respect to the chassis, wherein the bearing includes a house mounted to said wall at an opposite side of said wall from said product treating element;

a contactless seal comprising separate first and second elements, with said a first element being coupled for rotation with the shaft and being shaped such that a space concentric to said shaft is defined between an inner surface of said first element and said shaft and with said second element having a first portion coupled with the chassis of the harvesting machine and having a second portion located within said space and having an outer surface disposed in confronting, spaced relationship to said inner surface, wherein the first element and second portion of said second element cooperate to define a concentric gap between them.

2. The bearing arrangement as in claim 1, wherein said second portion of the second element projects through said opening in said wall and is fixed to said bearing house.

3. The bearing arrangement as in claim 1, wherein at least a portion of the inner surface of the first element extends along a direction that is non-parallel to the shaft axis.

4. The bearing arrangement as in claim 3, wherein the portion of the inner surface of the first element extends along a direction that is generally perpendicular to the shaft axis.

5. The bearing arrangement as in claim 1, wherein the gap defines a generally conical shape.

6. The bearing arrangement as in claim 1, wherein a first end of the gap defines a first diameter and a second end of the gap defines a second diameter that is larger than the first diameter, and wherein the second end of the gap is closer to the bearing than the first end of the gap.

7. The bearing arrangement as in claim 1, further including at least one additional seal positioned between the shaft and the second element and configured to further prevent contamination of the bearing.

8. The bearing arrangement as in claim 7, wherein the at least one additional seal has a flexible sealing element elements.

9. The bearing arrangement as in claim 1, wherein said inner surface of the first element defines a groove configured to channel elements from the treated product and further prevent contamination of the bearing.

10. The bearing arrangement as in claim 1, wherein the contactless seal generally defines a labyrinth.

11. The bearing arrangement as in claim 10, wherein the labyrinth is at least partially defined by at least one of said inner and outer surfaces being a stepped surface.

12. The bearing arrangement as in claim 11, wherein the stepped surface includes alternating flat surfaces extending parallel to said shaft axis and conical surfaces.

13. The bearing arrangement as in claim 11, wherein the labyrinth is further defined by both of said inner and outer surfaces being a stepped surface.

14. The bearing arrangement as in claim 13, wherein said outer surface defines a generally saw-toothed profile.

15. The bearing arrangement as in claim 11, wherein the inner surface of said first element a generally smooth surface.

16. The bearing arrangement as in claim 1, wherein a flange portion of the second element encloses at least a portion of the first element so that the first element and the second element cooperate to define a non-linear gap therebetween.

17. A harvesting machine comprising:
a chassis configured to provide structural support for the harvesting machine and having an upright wall joined thereto and provided with an opening;
a shaft having an end region projecting through said opening with the chassis so as to be rotatable about a shaft axis with respect to the chassis;
a product treating element coupled with the shaft so as to be rotatable therewith, and
a bearing arrangement including a bearing house coupling said end region of the shaft with the upright wall and containing a bearing;
a contactless seal including a first element that is coupled with the shaft so as to be rotatable therewith, and a second element that is coupled with the bearing house, wherein the first and second elements respectively have first and second confronting surfaces which cooperate to define a gap between them configured to substantially prevent contamination of the bearing, and wherein at least a portion of the second element is substantially concentrically enclosed by the first element.

18. The harvesting machine, as in claim 17, wherein the second element is so configured relative to said first element that said first surface of the first element and said second surface of the second element cooperate to define a gap that includes a portion that is substantially U-shaped in cross section.

* * * * *